(12) United States Patent
Dingli (10) Patent No.: US 10,850,702 B2
(45) Date of Patent: Dec. 1, 2020

(54) VEHICLE SEAT BELT MONITORING (71) Applicant: Pony.ai, Inc., Fremont, CA (US)

(72) Inventor: Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/356,638

(22) Filed: Mar. 18, 2019

(65) Prior Publication Data

US 2020/0298794 A1 Sep. 24, 2020

(51) Int. Cl.
*B60R 22/48* (2006.01)
*H04N 5/232* (2006.01)
*G06F 9/30* (2018.01)

(52) U.S. Cl.
CPC ............ *B60R 22/48* (2013.01); *G06F 9/3004* (2013.01); *H04N 5/23296* (2013.01); *B60R 2022/4816* (2013.01)

(58) Field of Classification Search
CPC ............ B60R 22/48; B60R 2022/4816; G06F 9/3004; H04N 5/23296
See application file for complete search history.

(56) References Cited

U.S. PATENT DOCUMENTS

| | | | |
|---|---|---|---|
| 7,164,117 B2* | 1/2007 | Breed | B60R 21/01516 250/208.1 |
| 9,527,477 B1* | 12/2016 | Cech | B60R 22/48 |
| 10,377,342 B1 | 8/2019 | Wengreen et al. | |
| 2007/0085669 A1* | 4/2007 | Becker | B60R 22/48 340/457.1 |
| 2007/0195990 A1* | 8/2007 | Levy | B60R 22/48 382/100 |
| 2014/0266623 A1* | 9/2014 | Graumann | B60R 25/305 340/10.1 |
| 2016/0078306 A1* | 3/2016 | Artan | G06K 9/6269 382/104 |
| 2017/0268897 A1* | 9/2017 | Yuan | B60W 40/08 |
| 2018/0136655 A1 | 5/2018 | Kim et al. | |
| 2018/0239975 A1* | 8/2018 | Tamrakar | G06K 9/00261 |
| 2018/0281627 A1 | 10/2018 | Ali | |
| 2018/0326944 A1* | 11/2018 | Cech | G06K 9/2018 |
| 2019/0193676 A1* | 6/2019 | Thomas | B60R 22/48 |
| 2019/0197326 A1* | 6/2019 | Ohno | B60R 22/12 |

(Continued)

FOREIGN PATENT DOCUMENTS

KR 20150112491 A * 10/2015

OTHER PUBLICATIONS

Machine translation of KR-20150112491-A (Year: 2015).*

*Primary Examiner* — Navid Ziaeianmehdizadeh
*Assistant Examiner* — Gabriel Anfinrud
(74) *Attorney, Agent, or Firm* — Sheppard Mullin Richter & Hampton LLP (57) ABSTRACT

Systems, methods, and non-transitory computer readable media may be configured to facilitate monitoring usage of a vehicle seat belt. An image capture device may have a field of view directed at a seat belt system of a vehicle. The image capture device may be configured to capture an image of the seat belt system. The image may be defined by image information. The image information may be obtained. Whether a seat belt of the seat belt system is or is not being used by a passenger may be determined based on an analysis of the image. An alert may be generated responsive to a determination that the seat belt is not being used by the passenger.

20 Claims, 5 Drawing Sheets

(56) References Cited

U.S. PATENT DOCUMENTS

| | | | |
|---|---|---|---|
| 2019/0225186 A1* | 7/2019 | Szawarski | B60R 22/48 |
| 2020/0023808 A1* | 1/2020 | Terai | B60R 22/12 |
| 2020/0231109 A1* | 7/2020 | Baltaxe | G06K 9/6267 |

* cited by examiner

VEHICLE SEAT BELT MONITORING

FIELD OF THE INVENTION

This disclosure relates to approaches for monitoring usage of a seat belt by a person inside a vehicle.

BACKGROUND

Usage of seat belts by persons (e.g., passenger, driver) inside a vehicle is important for safety of the person. Seat belt latch detection switches may be easily faked or subject to unreliability. For example, a person may buckle a seat belt into a seat belt buckle and then seat on top of the seat belt. A camera-based seat belt detection system may cause privacy concerns for persons inside the vehicle. A person may reject the usage of a camera inside the vehicle to maintain privacy. Moreover, the camera-based seat belt detection system may be faked as well. For example, a person may wear clothing with pattern that imitates seat belt usage rather than using the seat belt.

SUMMARY

Various embodiments of the present disclosure may include systems, methods, and non-transitory computer readable media configured to facilitate monitoring usage of a vehicle seat belt. An image capture device may have a field of view directed at a seat belt system of a vehicle. The image capture device may be configured to capture an image of the seat belt system. The image may be defined by image information. The image information may be obtained. Whether a seat belt of the seat belt system is or is not being used by a passenger may be determined based on an analysis of the image. An alert may be generated responsive to a determination that the seat belt is not being used by the passenger.

In some embodiments, the field of view may be limited such that a majority of the image includes depiction of one or more parts of the seat belt system.

In some embodiments, a direction of the field of view may be automatically changed to keep a seat belt buckle of the seat belt system within the field of view.

In some embodiments, the analysis of the image may determine whether a seat belt tongue is inserted into a seat belt buckle and whether a lap-belt extends over a lap of the passenger.

In some embodiments, the image capture device may include an infrared camera and the seat belt system may include one or more infrared reflective materials. The vehicle may include an infrared light source. For example, a first infrared reflective material may be positioned on a seat belt buckle and a second infrared reflective material may be positioned on a seat belt tongue, and the determination that the seat belt is not being used by the passenger may be performed based on a relative position of the first infrared reflective material to the second infrared reflective material. As another example, a first infrared reflective material may be positioned on a seat belt buckle and a second infrared reflective material may be positioned on a lap-belt and/or a shoulder-belt, and the determination that the seat belt is not being used by the passenger may be performed based on a pattern formed by the first infrared reflective material and the second infrared reflective material.

In some embodiments, a resolution of the camera may be limited such that passenger facial details are not distinguishable within the image.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In various implementations, an image capture device may have a field of view directed at a seat belt system of a vehicle. The image capture device may be configured to capture one or more images of the seat belt system. The image(s) may be defined by image information. The image information may be obtained. Whether a seat belt of the seat belt system is or is not being used by a person in the vehicle (e.g., driver, passenger) may be determined based on an analysis of the image(s). An alert may be generated responsive to a determination that the seat belt is not being used by the person.

The field of view of the image capture device may be limited to reduce capturing depiction of the person. For example, the field of view of the image capture device may be limited such that a majority of the image(s) includes depiction of one or more parts of the seat belt system. The direction in which the image capture device is pointed may be changed automatically to keep the seat belt system within the field of view. For example, a direction of the field of view may be automatically changed to keep a seat belt buckle of the seat belt system within the field of view.

The image(s) may be analyzed to determine status of different parts of the seat belt system. For example, the analysis of the image(s) may determine whether a seat belt tongue is inserted into a seat belt buckle, whether a lap-belt extends over a lap of the person, and/or whether a shoulder-belt extends over a chest of the person.

The image capture device may be configured to capture a given type of light and the seat belt system may include one or more materials that reflect the given type of light. For example, the image capture device may include an infrared camera and the seat belt system may include one or more infrared reflective materials. The vehicle may include a light source that provides the given type of light, such as an infrared light source. For example, a first infrared reflective material may be positioned on a seat belt buckle and a second infrared reflective material may be positioned on a seat belt tongue, and the determination that the seat belt is not being used by the person may be performed based on a relative position of the first infrared reflective material to the second infrared reflective material, as determined from the analysis of the image(s). As another example, a first infrared reflective material may be positioned on a seat belt buckle and a second infrared reflective material may be positioned on a lap-belt and/or a shoulder-belt, and the determination that the seat belt is not being used by the person may be performed based on a pattern formed by the first infrared reflective material and the second infrared reflective material, as determined from the analysis of the image(s).

The resolution of the image capture device may be limited to reduce capturing depiction of personally identifiable features (e.g., features from which a person can be identified). For example, the resolution of the camera may be limited such that the person's facial details are not distinguishable within the image(s).

The approaches disclosed herein provides for image-based detection of seat belt status for person(s) in a vehicle. The approaches include the use of an image capture device with a narrow-field of view to focus on the relevant areas of the vehicle to capture images of a seat belt system while reducing the amount of passenger details that are captured. The approaches include the use of an image capture device that captures images within which human features are difficult to distinguish/not distinguishable, such as due to the resolution of the image capture device and/or the radiation used by the image capture device to capture images. The approaches disclosed herein provides for automatic detection of whether a person is properly using a seat belt based on image capture that maintains the privacy of the person.

Figure 1:
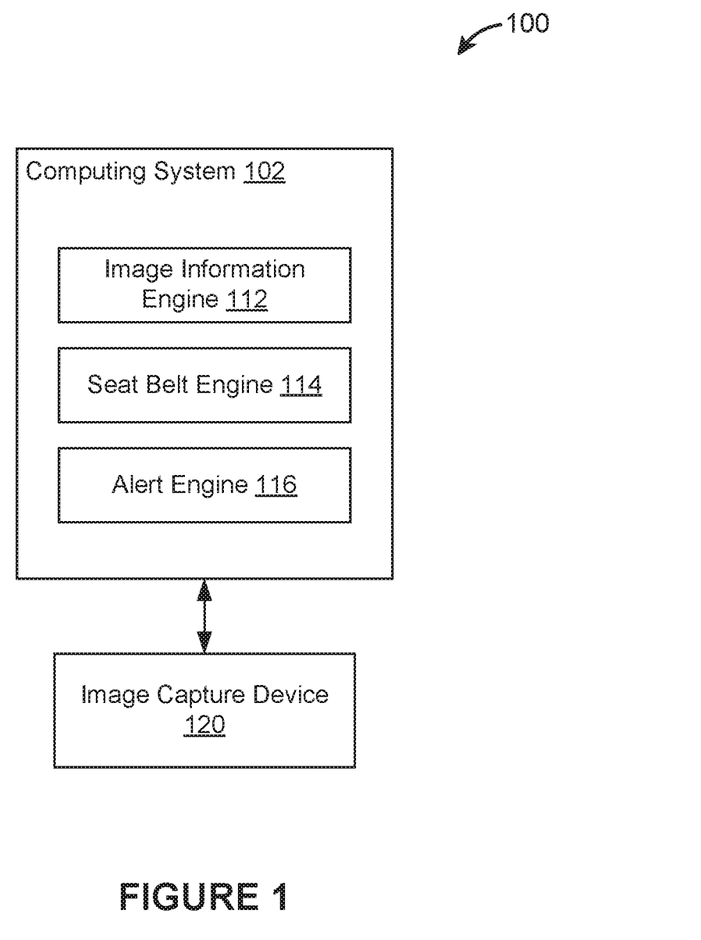
FIG. 1 illustrates an example environment for monitoring usage of a vehicle seat belt, in accordance with various embodiments.

FIG. 1 illustrates an example environment 100 for monitoring usage of a vehicle seat belt, in accordance with various embodiments. The example environment 100 may include a computing system 102 and an image capture device 120. The computing system 102 may be communicatively, electrically, and/or mechanically coupled to one or more components of the environment 100. For example, the computing system 102 may be coupled to the image capture device 120 to monitor usage of a vehicle seat belt. The coupling between the different components within the environment 100 may include direct coupling and/or indirect coupling.

While components 102, 120 of the environment 100 are shown in FIG. 1 as single entities, this is merely for ease of reference and is not meant to be limiting. For example, one or more components/functionalities of the computing system 102 described herein may be implemented, in whole or in part, within a single computing device or within multiple computing devices. The image capture device 120 may include a single tool/component or multiple tools/components that provide functionalities described herein. For example, the image capture device 120 may include a single image capture device, multiple image capture device of the same type, or different types of image capture devices.

The image capture device 120 may include a device (e.g., camera, sensor within a camera) that detects and/or conveys information that constitutes an image or a video. A video may include multiple images (video frames). The image capture device 120 may be configured to capture image(s) and/or video(s) of a seat belt system of a vehicle. A vehicle may refer to a thing used to transport one or more persons and/or one or more things. Examples of vehicle may include an autonomous vehicle, a non-autonomous vehicle, a taxi, a ride-share vehicle, a vehicle owned by an organization, a personally owned vehicle, and/or other vehicles.

A seat belt system of a vehicle may refer to one or more components of the vehicle that work together to provide one o more mechanisms for securing a person within the vehicle. The person may be secured within the vehicle to prevent injury to the person, such as during an accident. The seat belt system may include one or more seat belts (e.g., belt, strap), one or more seat belt buckles, and/or other mechanisms to secure a person within the vehicle. A seat belt may be attached to a seat belt tongue, which may be inserted into a seat belt buckle during the usage of the seat belt.

The image capture device 120 may be positioned within, carried by, and/or affixed to a vehicle to capture image(s) and/or video(s) of the seat belt system. The image(s) and/or video(s) of a seat belt system may depict whether a person in the vehicle is using the seat belt system. For example, the image(s) and/or video(s) of a seat belt system may depict whether a passenger or a driver in the vehicle is using a seat belt of the seat belt system (e.g., the person is secured by the seat belt, with the seat belt tongue of the seat belt inserted into a corresponding seat belt buckle).

The image capture device 120 may have a field of view directed at a seat belt system of a vehicle. That is, the observable extent of the image capture device 120 may include one or more parts of the seat belt system. The image capture device 120 may be configured to capture one or more images of the seat belt system. Images captured by the image capture device 120 may be separate images, images forming a sequence of images, images forming video frames of a video, and/or other images. The image(s) may be defined by image information. The image information may be contained within a single file or multiple files.

In some embodiments, the field of view of the image capture device 120 may be limited to reduce capturing depiction of the person in the vehicle. That is, the field of view of the image capture device 120 may be narrow so that image(s) captured by the image capture device 120 does not include depiction of the person in the vehicle or includes depiction of small part(s) of the person. For example, the field of view of the image capture device 120 may be limited such that a majority of the image(s) includes depiction of one or more parts of the seat belt system. That is, most (more than 50%) of pixels of the image(s) may depict the seat belt system/components of the seat belt system (e.g., seat belt, seat belt buckle) rather than depict the person. Use of the image capture device 120 with a narrow field of view may enable the image capture device 120 to capture image(s) that focus on one or more parts of the seat belt system, such as the seat belt latch area. For example, the image capture device 120 may be used to capture image(s) including depiction of a seat belt buckle, a seat belt tongue inserted into the seat belt buckle, and/or one or more portions of the seat belt extending over one or more portions of the person (e.g., lap-belt extending over a lap of the person, a shoulder-belt extending over a chest of the person).

In some embodiments, the direction in which the field of view of the image capture device 120 is pointed may be fixed. For example, the field of view of the image capture device 120 may be pointed to include one or more seat belt buckles. The seat belt buckle(s) may be assumed to remain in the same place for such positioning of the image capture device 120. In some embodiments, direction in which the field of view of the image capture device 120 is pointed may be changed. For example, direction in which the image capture device 120 is pointed may be changed automatically to keep the seat belt system within the field of view. For instance, the direction of the field of view may be automatically changed to keep one or more seat belt buckles of the seat belt system within the field of view.

In some embodiments, the image capture device 120 may capture images using radiation that makes human features difficult to distinguish within the images. One or more parts of the seat belt system may include materials that are reflective of radiation of which the image capture device 120 is sensitive. The vehicle may include one or more radiation sources to produce radiation of which the image capture device 120 is sensitive. That is, the image capture device 120 may be configured to capture a given type of light and the seat belt system may include one or more materials that reflect the given type of light. For instance, the image capture device 120 may include an infrared camera that capture images using infrared radiation, and the seat belt system may include one or more infrared reflective materials. The vehicle may include a light source that provides the given type of light, such as an infrared light source.

The reflective material may be positioned in the seat belt system to enable analysis of whether the seat belt system is being used. For example, referring to the example of the infrared camera, one or more infrared reflective materials may be positioned on (e.g., embedded thereon, painted on, integrated into) a seat belt buckle and seat belt tongue of the seat belt system. The reflection of the infrared radiation from the reflective material(s) may create easily feature(s) in the image(s) captured by the image capture device 120. Analysis of such image(s) may determine whether or not the seat belt is being used by a person based on the relative position of the different reflective materials, such as the relative position of the reflective material on the seat belt buckle to the reflective material on the seat belt tongue, as determined from the analysis of the image(s).

As another example, one or more infrared reflective materials may be positioned on a seat belt buckle, a lap-belt, and/or a shoulder-belt of the seat belt system. The reflection of the infrared radiation from the reflective material(s) may create easily distinguishable feature(s) in the image(s) captured by the image capture device 120. Analysis of such image(s) may determine whether or not the seat belt is being used by a person based on one or more patterns formed by the different reflective materials, such as one or more patterns formed by the reflective material on the seat belt buckle, the reflective material on the lap-belt, and/or the reflective material on the shoulder-belt, as determined from the analysis of the image(s).

Use of such radiation and reflective material may make it easier for person(s) inside the vehicle to accept use of the image capture device 120 for seat-belt usage detection. Privacy concerns of the person(s) may be avoided by using radiation that can reliably detect seat belt usage status while making human features difficult to distinguish within image(s). Use of such radiation and reflective material may also make it more difficult for person(s) to fool the camera-based seat belt detection system. For example, a person would have to wear clothing with reflective materials to imitate usage of the seat beat based on pattern of the clothing. Additionally, use of such radiation and reflective material may make it possible to detect usage of the seat belt in low light (visible light) conditions. For instance, use of infrared radiation and infrared reflective material may enable the image capture device 120 to capture image(s) with vivid infrared reflection from the seat belt system in low-light (visible light) conditions. Use of other types of radiation and other reflective materials are contemplated.

In some embodiments, the image capture device 120 may capture images using a resolution that makes human features difficult to distinguish within the images. That is, the resolution of the image capture device 120 (resolution with which the image capture device 120 captures images, resolution of the images) may be limited to reduce capturing depiction of personally identifiable features (e.g., features from which a person can be identified). For example, the resolution of the image capture device 120 may be limited such that the person's facial details are not distinguishable within the image(s). Use of low-resolution to capture images may make it easier for person(s) inside the vehicle to accept use of the image capture device 120 for seat-belt usage detection. Privacy concerns of the person(s) may be avoided by using resolution that is sufficient to/reliably detect seat belt usage status while making human features difficult to distinguish within image(s).

The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution. The computing system 102 may include an image information engine 112, a seat belt engine 114, an alert engine 116, and/or other engines.

In various embodiments, the image information engine 112 may be configured to obtain image information. The image information may define one or more images captured by the image capture device 120. Obtaining image information may include accessing, acquiring, analyzing, determining, examining, generating, identifying, loading, locating, opening, receiving, retrieving, reviewing, storing, and/or otherwise obtaining the image information. Image information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network), electronic storage of the image capture device 120, electronic storage coupled to the image capture device 120, and/or other electronic storage. Image information may be stored within a single file or within multiple files.

In various embodiments, the seat belt engine 114 may be configured to determine whether or not a seat belt of the seat belt system is or is not being used by a person (e.g., driver, passenger) in the vehicle. Whether or not a seat belt of the seat belt system is or is not being used by a person in the vehicle may be determined based on an analysis of the image(s) captured by the image capture device 120. An analysis of an image may include evaluation of one or more characteristics (e.g., color, hue, brightness) of pixels and/or groups of pixels within the image. An analysis of an image may include object detection, pattern detection, and/or other visual analysis of the image. An analysis of an image may be performed using one or more machine-learning techniques.

For example, the image(s) may be analyzed to determine status of different parts of the seat belt system. For instance, The analysis of the image(s) may determine whether a seat belt tongue is inserted into a seat belt buckle, whether a lap-belt extends over a lap of the person, and/or whether a shoulder-belt extends over a chest of the person. That is, the analysis of the image(s) may include evaluation of pixel characteristics to determine whether one or more parts of the seat belt system is being properly used. For example, the image analysis may be used to recognize a seat belt buckle in catch plus a lap-belt extending over a lap of a person as the corresponding seat belt being used (properly used) by a person in the vehicle. The image analysis may be used to recognize a lap-belt or a shoulder-belt not extending over the corresponding portions (lap, chest) of the person as the corresponding seat belt not being used (not being used properly) by a person in the vehicle. The image analysis may use relative positions of different parts of a seat belt system and/or a pattern formed by different parts of the seat belt system to determine whether the corresponding seat belt is or is not being used by a person in the vehicle. Other analysis of the image(s) are contemplated.

In various embodiments, the alert engine 116 may be configured to generate one or more alerts responsive to a determination that the seat belt is not being used by the person in the vehicle. An alert may include a notice that the seat belt is not being used and/or not being used properly be the person. An alert may indicate that the person is not using the seat belt and/or is improperly using the seat belt. An alert may be generated for provision to one or more computing devices and/or one or more persons. For example, an alert generated by the alert engine 116 may include a message and/or may prompt a message to be generated. The message may include information indicating that the seat belt is not being used (not being used at all, not being used properly) by the person in the vehicle.

The alert/message may be provided to one or more persons (e.g., a driver of the vehicle, one or more passengers of the vehicle, a remote person), and/or a computing device. The alert/message may be provided visually, audibly, and/or electronically. For example, the driver and/or a remote operator (e.g., vehicle coordinator, safety personnel) may be provided with a message stating that a passenger is not using the seat belt. As another example, the passenger may be provided with a message asking the passenger to use the seat belt. As yet another example, the vehicle and/or one or more particular computing components of the vehicle may be provided with the alert. The vehicle may operate differently based on the alert. For example, the vehicle may include an autonomous vehicle and the autonomous vehicle may not start moving and/or may stop moving (e.g., come to a safe stop) based on the alert that a person inside the vehicle is not using a seat belt.

Figure 2A:
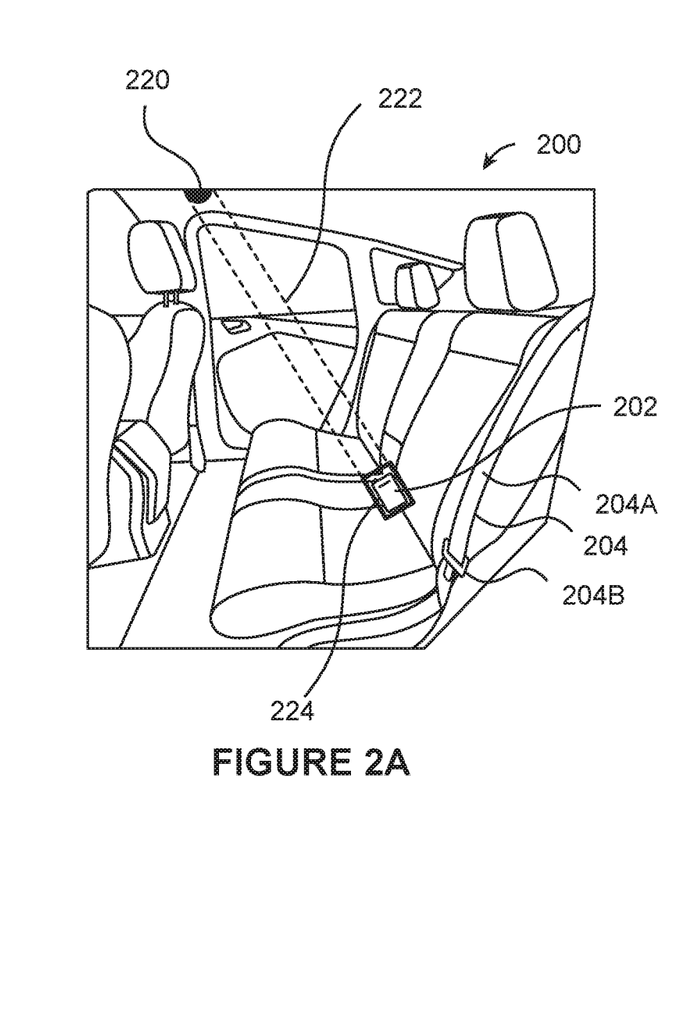
FIG. 2A illustrates an example environment for monitoring usage of a vehicle seat belt, in accordance with various embodiments.

FIG. 2A illustrates an example environment 200 for monitoring usage of a vehicle seat belt, in accordance with various embodiments. The environment 200 may include a cabin of a vehicle. The vehicle may include a seat belt system, which may include a seat belt buckle 202 and a seat belt 204. The seat belt 204 may include a belt 204A (lap-belt, shoulder-belt) and a seat belt tongue 204B. The vehicle may include an image captured device 220. The field of view 222 of the image capture device 220 may be directed towards one or more parts of the seat belt system. For example, the field of view 222 of the image capture device 220 may be directed towards the seat belt buckle 202, such that an image captured by the image capture device 220 includes depiction of an area 224. The direction in which the field of view 222 of the image capture device 220 is pointed may be fixed (image captured always includes the area 224). The direction in which the field of view 222 of the image capture device 220 is pointed may be changed, such as to keep one or more parts the seat belt system within the field of view 222 (direction of field of view changed to keep the seat belt buckle 202 within the field of view 222).

One or more images captured by the image capture device 220 may be analyzed to determine whether a person is using the seat belt system of the vehicle. For example, image(s) captured by the image capture device 220 may be analyzed to determine whether a person has inserted the seat belt tongue 204B in the seat belt buckle 202. The status of the seat belt tongue 204B being inserted in the seat belt buckle 202 may be used to determine whether the person is using (properly using) the seat belt 204. The analysis of the image(s) may recognize status of other parts of the seat belt system to determine usage of the seat belt system. For example, in addition to recognizing the seat belt tongue 204B being inserted in the seat belt buckle 202, the image analysis may recognize that a portion of the lap-belt of the belt 204A extends over a lap of a person. Confirmation of usage status of both the seat belt buckle 202/seat belt tongue 204B and the lap-belt of the belt 204A may be required for a determination that the seat belt 204 is being used by the person. As another example, the field of view 222 of the image capture device 220 may be directed towards an area that captures shoulder-belt of the belt 204A. The image analysis may recognize that the shoulder-belt of the belt 204A extends over the chest of the person, and this recognition may be used to determine whether the seat belt 204 is being used by the person.

Figure 2B:
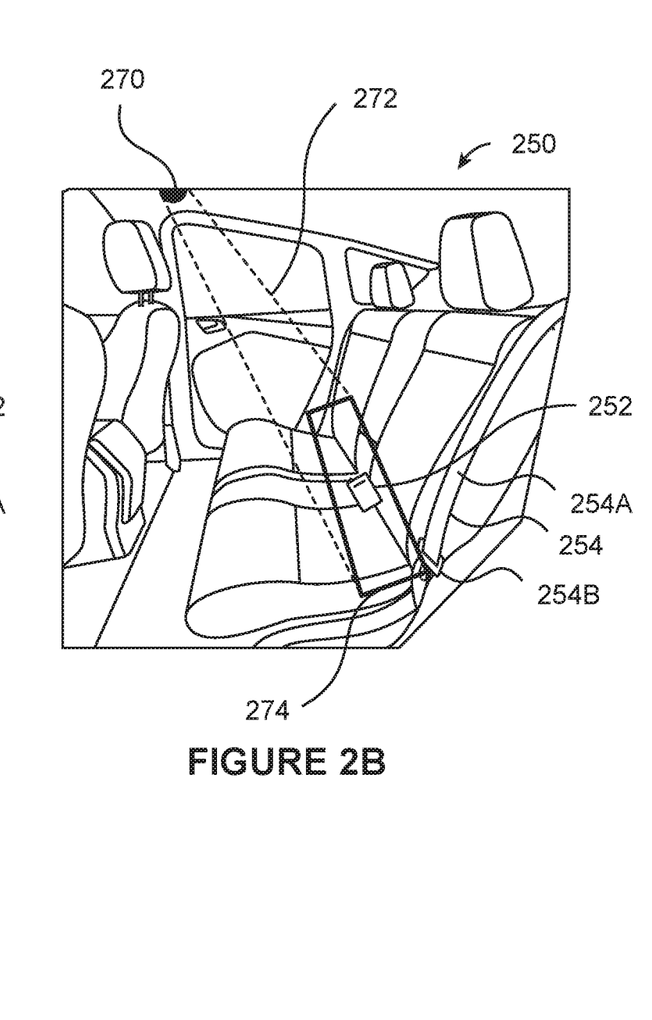
FIG. 2B illustrates an example environment for monitoring usage of a vehicle seat belt, in accordance with various embodiments.

FIG. 2B illustrates an example environment 250 for monitoring usage of a vehicle seat belt, in accordance with various embodiments. The environment 250 may include a cabin of a vehicle. The vehicle may include a seat belt system, which may include a seat belt buckle 252 and a seat belt 254 for a passenger sitting on the left side of the vehicle. The seat belt system may include other parts, such as seat belt buckle 2 and seat belts for passenger sitting in the middle of the vehicle and a passenger sitting on the right side of the vehicle. The seat belt 254 may include a belt 254A (lap-belt, shoulder-belt) and a seat belt tongue 254B. The vehicle may include an image captured device 270. The field of view 272 of the image capture device 270 may be directed towards one or more parts of the seat belt system. For example, the field of view 272 of the image capture device 270 may be directed towards the seat belt buckle 252 and other seat belt buckles in the back seats, such that an image captured by the image capture device 270 includes depiction of an area 274.

The inclusion of the area 274 within the image may enable analysis of the image to determine whether persons (e.g., left-side passenger, center passenger, right-side passenger) in the back seat are using the seat belt system of the vehicle (e.g., using the left seat belt, using the center seat belt, using the right seat belt). For example, image(s) captured by the image capture device 270 may be analyzed to determine whether one or more persons in the back seat has inserted a seat belt tongue (e.g., the seat belt tongue 254B) in a seat belt buckle (e.g., the seat belt buckle 252). The status of the seat belt tongue(s) being inserted in the seat belt buckle(s) may be used to determine whether the person(s) are using (properly using) the seat belt(s). The analysis of the image(s) may recognize status of other parts of the seat belt system to determine usage of the seat belt system. For example, in addition to recognizing the seat belt tongue 254B being inserted in the seat belt buckle 252, the image analysis may recognize that the lap-belt of the belt 254A extends over a lap of a person. Confirmation of usage status of both the seat belt buckle 252/seat belt tongue 254B and the lap-belt of the belt 254A may be required for a determination that the seat belt 254 is being used by the person. As another example, the field of view 272 of the image capture device 270 may be directed towards an area that captures shoulder-belt(s) of the seat belt system (e.g., the shoulder-belt of the belt 254A). The image analysis may recognize that the shoulder-belt(s) extends over the chest(s) of the person, and this recognition may be used to determine whether the seat belt(s) are being used by the person(s).

Figure 3A:
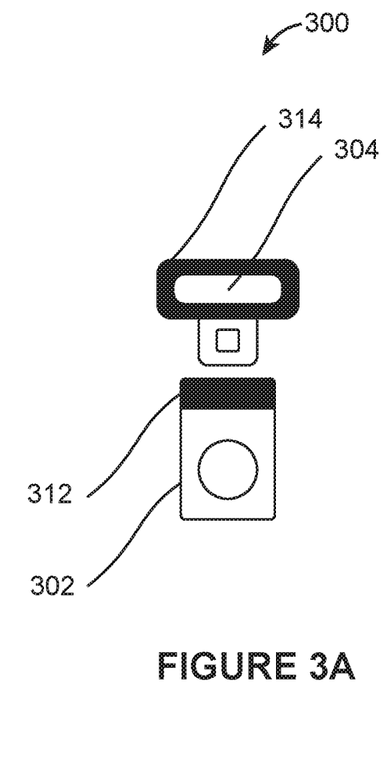
FIG. 3A illustrates example positioning of reflective material on a seat belt system, in accordance with various embodiments.

FIG. 3A illustrates example positioning 300 of reflective material on a seat belt system, in accordance with various embodiments. A reflective material 312 may be positioned on a seat belt buckle 302 and a reflective material 314 may be positioned on a seat belt tongue 304. An image capture device may be sensitive to the radiation reflected by the reflective materials 312, 314. For example, the image capture device may include an infrared camera and the reflective materials 312, 314 may include infrared reflective materials. The reflection of the infrared radiation from the reflective materials 312, 314 may create easily distinguishable feature(s) in the image(s) captured by the infrared camera.

The image(s) may be analyzed to determine relative position of the seat belt buckle 302 to the seat belt tongue 304. The relative position of the seat belt buckle 302 to the seat belt tongue 304 may be used to determine whether the seat belt of the seat belt buckle 302/seat belt tongue 304 is being used by a person in a vehicle. For example, based on the seat belt buckle 302 not being aligned to the seat belt tongue 304 and/or the seat belt buckle 302 not being within a certain distance from the seat belt tongue 304, it may be determined that the seat belt tongue 304 has not been inserted into the seat belt buckle 304 (the seat belt is not being used). As another example, based on the seat belt buckle 302 being aligned to the seat belt tongue 304 and the seat belt buckle 302 being within a certain distance from the seat belt tongue 304, it may be determined that the seat belt tongue 304 has been inserted into the seat belt buckle 304 (the seat belt is being used). Use of relative positions of other parts of the seat belt system to determine usage of a seat belt are contemplated.

Figure 3B:
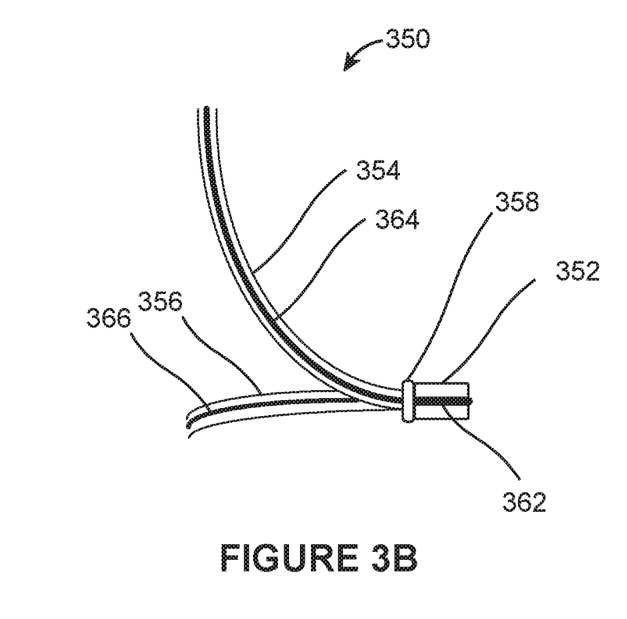
FIG. 3B illustrates example positioning of reflective material on a seat belt system, in accordance with various embodiments.

FIG. 3B illustrates example positioning 350 of reflective material on a seat belt system, in accordance with various embodiments. A reflective material 362 may be positioned on a seat belt buckle 352, a reflective material 364 may be positioned on a shoulder-belt 354, and a reflective material 366 may be positioned on a lap-belt 356. An image capture device may be sensitive to the radiation reflected by the reflective materials 362, 364, 366. For example, the image capture device may include an infrared camera and the reflective materials 362, 364, 366 may include infrared reflective materials. The reflection of the infrared radiation from the reflective materials 362, 364, 366 may create easily distinguishable feature(s) in the image(s) captured by the infrared camera.

The image(s) may be analyzed to determine a pattern formed by two or more of the reflective materials 362, 364, 366. The pattern formed by two or more of the reflective materials 362, 364, 366 may be used to determine whether the seat belt of the seat belt buckle 352/seat belt tongue 358 is being used by a person in a vehicle. For example, when the seat belt tongue 358 is properly inserted into the seat belt buckle 352, the reflective material 362 and one or both of the reflective materials 364, 366 may be aligned near the seat belt tongue 358 (e.g., form a straight line, form a line that does not deviate from a straight line by more than a threshold degree). As another example, when the seat belt tongue 358 is properly inserted into the seat belt buckle 352, the reflective material 364 and the reflective material 366 may form a pattern with two curves meeting at a certain angle/angel range. Based on the pattern formed by two or more of the reflective materials 362, 364, 366, it may be determined that the seat belt tongue 358 has been inserted into the seat belt buckle 352 (the seat belt is being used). Use of other types of patterns to determine usage of a seat belt are contemplated.

Figure 4:
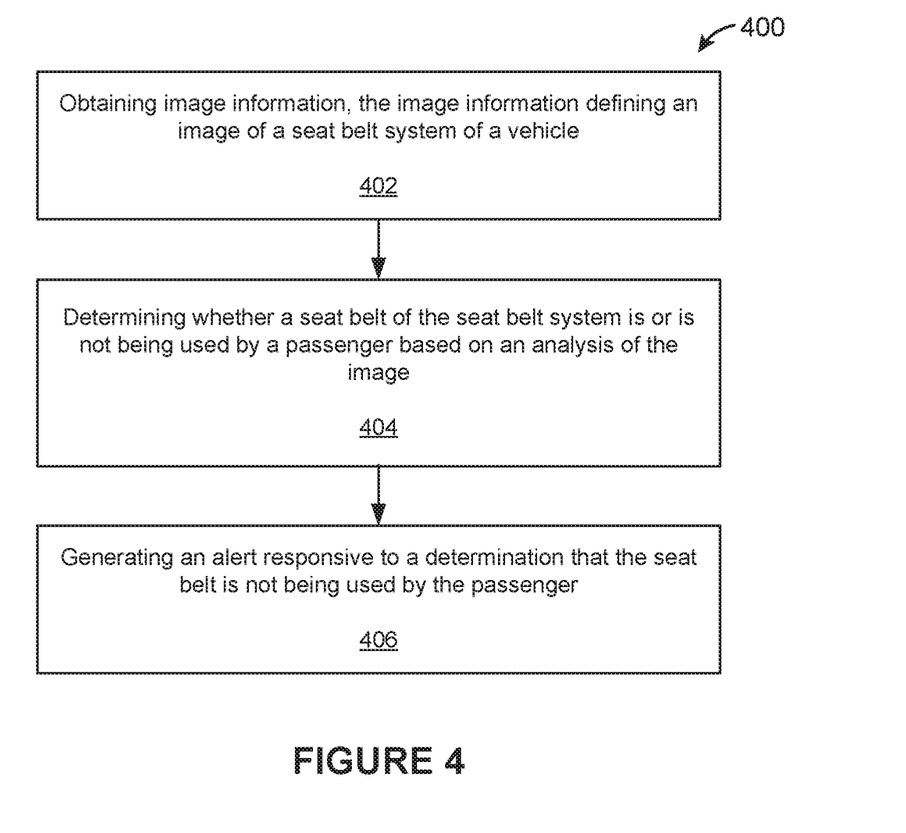
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, image information may be obtained. The image information may define an image of a seat belt system of a vehicle. At block 404, whether a seat belt of the seat belt system is or is not being used by a passenger of the vehicle may be determined based on an analysis of the image. At block 406, responsive to a determination that the seat belt is not being used by the passenger, an alert may be generated.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hardwired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
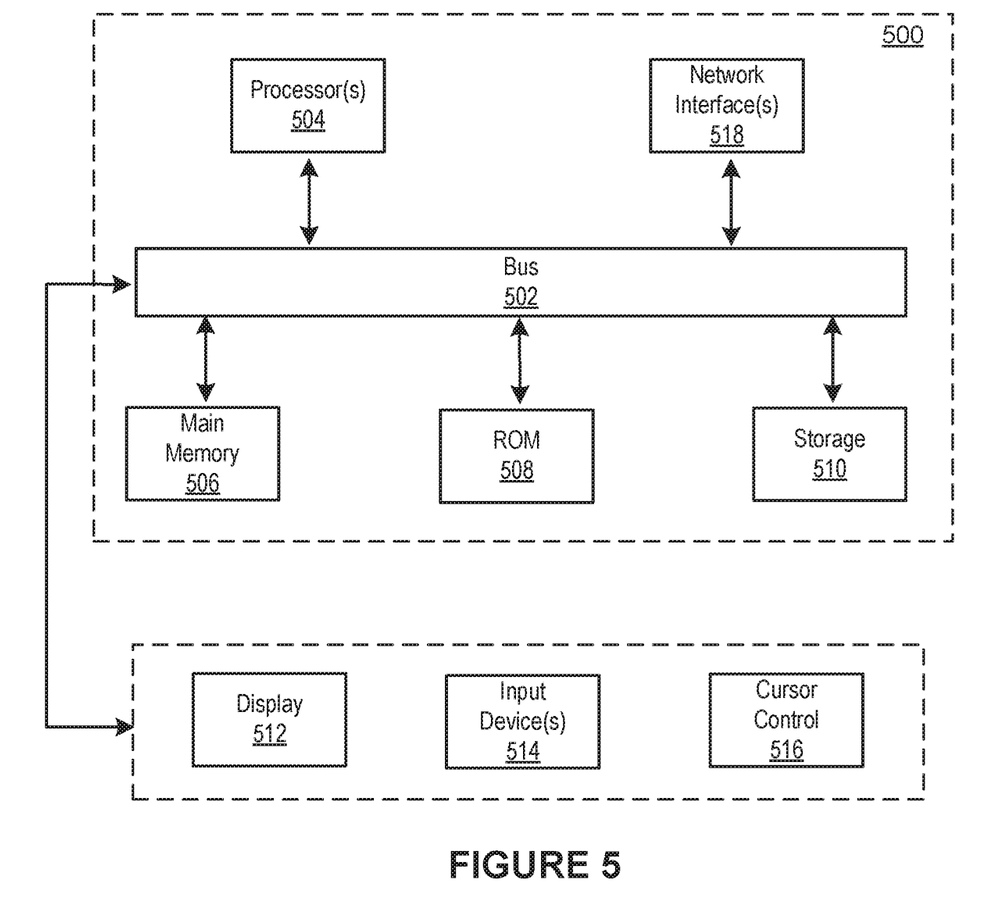
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   at least one image capture device having at least one field of view directed at a seat belt system of a vehicle, the seat belt system comprising at least a first seat belt system component and a second seat belt system component, the at least one image capture device configured to capture a first image and a second image of the seat belt system, the first image defined by first image information and the second image defined by second image information, wherein a majority of the first image depicts the first seat belt system component and a majority of the second image depicts the second seat belt system component, and wherein each of the first image and the second image excludes or obscures facial features of a passenger capable of being restrained by the seat belt system such that the passenger cannot be uniquely identified from either of the first image or the second image;
   one or more processors; and
   a memory storing instructions that, when executed by the one or more processors, cause the system to perform operations comprising:
      obtaining the first image information and the second image information;
      determining one or more use characteristics of at least one of the first seat belt system component or the second seat belt system component by the passenger based on an analysis of the first image and the second image;
      determining, based at least in part on the one or more use characteristics, that the seat belt system is not being properly used by the passenger; and
      generating an alert responsive to a determination that the seat belt system is not being properly used by the passenger.

2. The system of claim 1, wherein the at least one field of view of the at least one image capture device is narrowed such that each of the first image and the second image excludes the facial features of the passenger.

3. The system of claim 1, wherein the at least one image capture device comprises a first image capture device having a first field of view and a second image capture device having a second field of view, and wherein the first image capture device is configured to automatically change a direction of the first field of view to keep the first seat belt system component within the first field of view and the second image capture device is configured to automatically change a direction of the second field of view to keep the second seat belt system component within the second field of view.

4. The system of claim 1, wherein the first seat belt system component comprises a seat belt buckle and a seat belt tongue, and wherein determining the one or more use characteristics of the first seat belt component comprises determining whether the seat belt tongue is inserted into the seat belt buckle.

5. The system of claim 1, wherein the at least one image capture device includes an infrared camera and the seat belt system includes one or more infrared reflective materials.

6. The system of claim 5, wherein the first seat belt system component comprises a seat belt buckle and a seat belt tongue, and wherein a first infrared reflective material is positioned on the seat belt buckle and a second infrared reflective material is positioned on the seat belt tongue, and wherein determining that the seat belt system is not being properly used by the passenger comprises determining that the seat belt system is not being properly used based on a relative position of the first infrared reflective material to the second infrared reflective material.

7. The system of claim 5, wherein the first seat belt system component comprises a seat belt buckle and the second seat belt system component comprises at least one of a lap belt or a shoulder belt, wherein a first infrared reflective material is positioned on the seat belt buckle and a second infrared reflective material is positioned on at least one of the lap belt or the shoulder belt, and wherein determining that the seat belt system the is not being properly used by the passenger comprises determining that the seat belt system is not being properly used based on a pattern formed by the first infrared reflective material and the second infrared reflective material.

8. The system of claim 5, wherein the vehicle includes an infrared light source.

9. The system of claim 1, wherein the at least one image capture device comprises a first image capture device that captures the first image, and wherein execution of the instructions by the one or more processors further causes the system to perform:
limiting a resolution of the first image capture device; and
causing the first image capture device to capture the first image at the limited resolution such that the facial features of the passenger are obscured and the passenger cannot be uniquely identified from the first image.

10. A method implemented by a computing system including one or more processors and storage media storing machine-readable instructions, wherein the method is performed using the one or more processors, the method comprising:
obtaining first image information and second image information, the first image information defining a first image of a seat belt system of a vehicle and the second image information defining a second image of the seat belt system, the seat belt system comprising at least a first seat belt system component and a second seat belt system component, the first image and the second image being captured by at least one image capture device having at least one field of view directed at the seat belt system, wherein a majority of the first image depicts the first seat belt system component and a majority of the second image depicts the second seat belt system component, and wherein each of the first image and the second image excludes or obscures facial features of a passenger capable of being restrained by the seat belt system such that the passenger cannot be uniquely identified from either the first image or the second image;
determining one or more use characteristics of at least one of the first seat belt system component or the second seat belt system component by the passenger based on an analysis of the first image and the second image;
determining, based at least in part on the one or more use characteristics, that the seat belt system is not being properly used by the passenger; and
generating an alert responsive to a determination that the seat belt system is not being properly used by the passenger.

11. The method of claim 10, wherein the at least one field of view of the at least one image capture device is narrowed such that each of the first image and the second image excludes the facial features of the passenger.

12. The method of claim 11, further comprising:
automatically changing a direction of the at least one narrowed field of view in response to movement of the first seat belt system component and the second seat belt system component to ensure that each of the first image and the second image continues to exclude the facial features of the passenger such that passenger cannot be uniquely identified from either the first image or the second image.

13. The method of claim 10, wherein the at least one image capture device comprises a first image capture device having a first field of view and a second image capture device having a second field of view, and wherein the first image capture device is configured to automatically change a direction of the first field of view to keep the first seat belt system component within the first field of view and the second image capture device is configured to automatically change a direction of the second field of view to keep the second seat belt system component within the second field of view.

14. The method of claim 10, wherein the first seat belt system component comprises a seat belt buckle and a seat belt tongue, and wherein determining the one or more use characteristics of the first seat belt component comprises determining whether the seat belt tongue is inserted into the seat belt buckle.

15. The method of claim 10, wherein the at least one image capture device includes an infrared camera and the seat belt system includes one or more infrared reflective materials.

16. The method of claim 15, wherein the first seat belt system component comprises a seat belt buckle and a seat belt tongue, and wherein a first infrared reflective material is positioned on the seat belt buckle and a second infrared reflective material is positioned on the seat belt tongue, and wherein determining that the seat belt system is not being properly used by the passenger comprises determining that the seat belt system is not being properly used based on a relative position of the first infrared reflective material to the second infrared reflective material.

17. The method of claim 15, wherein the first seat belt system component comprises a seat belt buckle and the second seat belt system component comprises at least one of a lap belt or a shoulder belt, wherein a first infrared reflective material is positioned on the seat belt buckle and a second infrared reflective material is positioned on at least one of the lap belt or the shoulder belt, and wherein determining that the seat belt system is not being properly used by the passenger comprises determining that the seat belt system is not being properly used based on a pattern formed by the first infrared reflective material and the second infrared reflective material.

18. The method of claim 15, wherein the vehicle includes an infrared light source.

19. The method of claim 10, wherein the at least one image capture device comprises a first image capture device that captures the first image, the method further comprising:
limiting a resolution of the first image capture device; and
causing the first image capture device to capture the first image at the limited resolution such that the facial features of the passenger are obscured and the passenger cannot be uniquely identified from the first image.

20. A non-transitory computer readable medium comprising instructions that, when executed, cause one or more processors to perform:

obtaining first image information and second image information, the first image information defining a first image of a seat belt system of a vehicle and the second image information defining a second image of the seat belt system, the seat belt system comprising at least a first seat belt system component and a second seat belt system component, the first image and the second image being captured by at least one image capture device, having at least one field of view directed at the seat belt system, wherein a majority of the first image depicts the first seat belt system component and a majority of the second image depicts the second seat belt system component, and wherein each of the first image and the second image excludes or obscures facial features of a passenger capable of being restrained by the seat belt system such that the passenger cannot be uniquely identified from either the first image or the second image;

determining one or more use characteristics of at least one of the first seat belt system component or the second seat belt system component by the passenger based on an analysis of the first image and the second image;

determining, based at least in part on the one or more use characteristics, that the seat belt system is not being properly used by the passenger; and generating an alert responsive to a determination that the seat belt system is not being properly used by the passenger.

* * * * *